P. N. KENWAY.
CONDUIT.
APPLICATION FILED APR. 2, 1910.
1,168,400.
Patented Jan. 18, 1916.
2 SHEETS—SHEET 1.
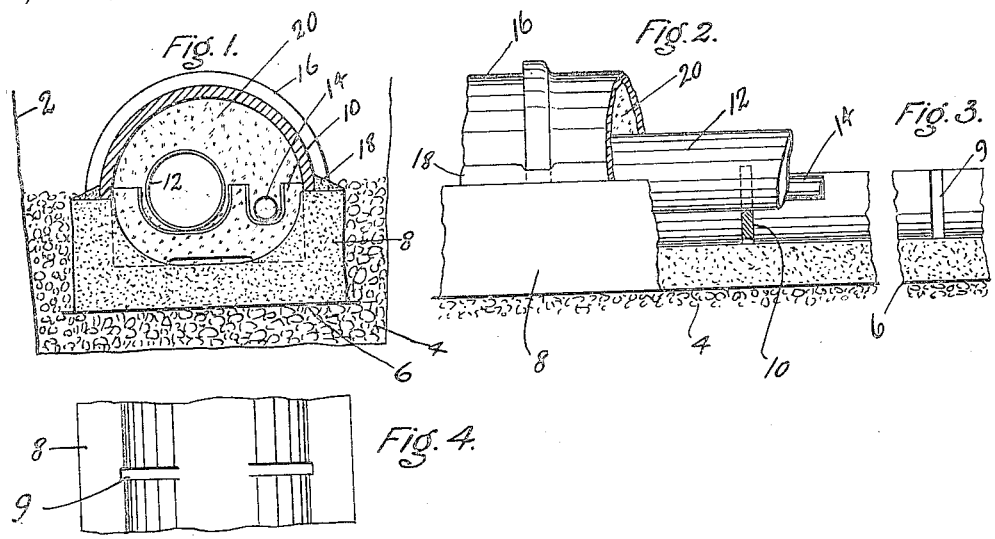
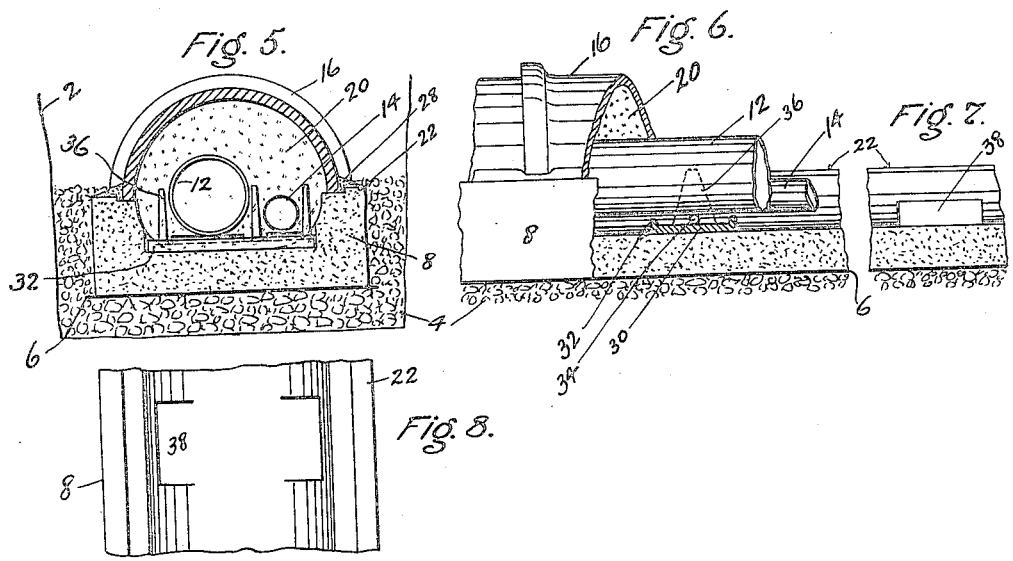
WITNESSES:
Percy N. Kenway, INVENTOR.

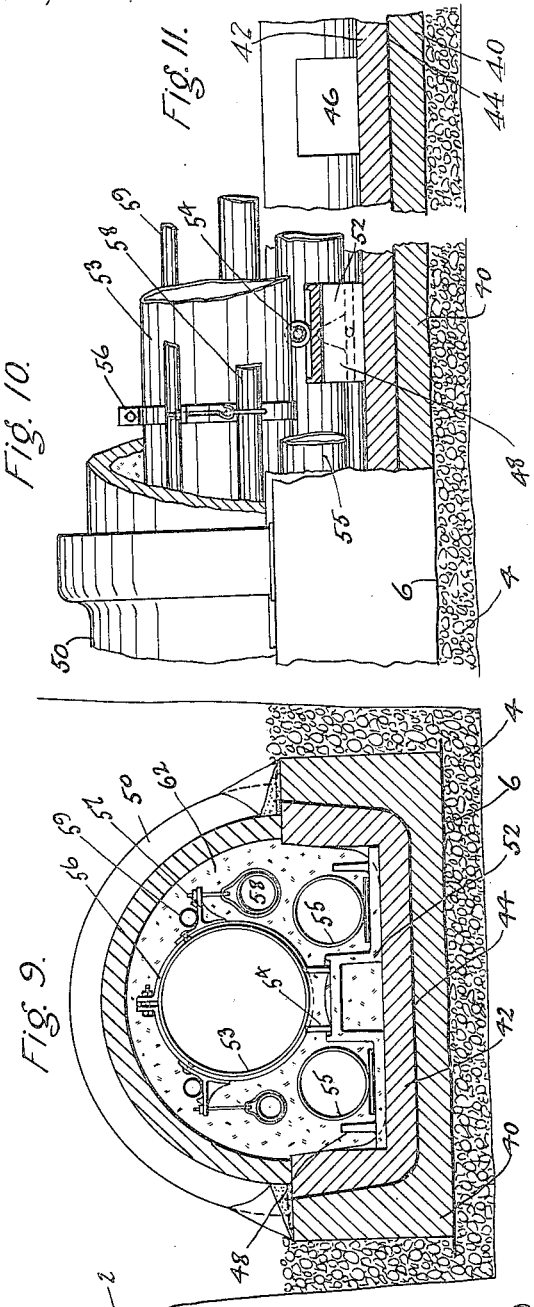

UNITED STATES PATENT OFFICE.

PERCY N. KENWAY, OF NEWTON, MASSACHUSETTS.

CONDUIT.

1,168,400.

Specification of Letters Patent. Patented Jan. 18, 1916.

Application filed April 2, 1910. Serial No. 553,055.

*To all whom it may concern:*

Be it known that I, PERCY N. KENWAY, a citizen of the United States, residing at Newton, in the county of Middlesex and State of Massachusetts, have invented certain new and useful Improvements in Conduits, of which the following is a specification.

This invention relates to conduits of the type in which it is the practice to lay pipes for purposes of insulation and protection for carrying steam, hot water or refrigerating medium when it is desired to extend such pipes underground from one building to another.

More particularly the invention relates to an improved method of constructing such conduits and to the novel conduit herein shown as produced by such improved method.

In work of this class the superiority of a concrete or cement conduit over the older types of wooden conduits is unquestioned but the cost of such conduits has heretofore proved prohibitive in many cases.

It is, accordingly, an object of the present invention to devise a conduit which may be constructed at a relatively low cost but which shall possess all the advantages offered by the more costly conduits heretofore known and which, in certain respects to be hereinafter pointed out, shall possess advantages over the latter.

I have discovered that a conduit comprising an integral or monolithic concrete or cement trough-shaped bottom portion and a covering of channel piping or sectional cement arches may be constructed at a relatively low cost and will possess all the necessary qualifications. It is admittedly unnecessary to furnish more than a relatively thin layer of heat insulating material on the lower side of piping carried in such a conduit. By flattening the lower section of such conduit a great saving in the quantity of such material may be effected, as compared with a cylindrical conduit.

Another object of the invention is to provide a conduit which shall be of waterproof character. In accordance with the present invention this result is secured by constructing the lower portion of the conduit in two sections, one within the other, with a layer of waterproof material interposed between them. As herein shown, a waterproof joint between the lower portion so formed and the upper or cover portion is secured by forming a retaining flange or shoulder along the upper edges of the lower portion extending parallel with the surface of the upper portion and spaced therefrom, and filling the channel so formed with a pitch-like material. This feature of the invention is not limited to conduits embodying in their construction monolithic or integral sections but is of more general application.

Other novel features of the invention will be best understood and appreciated from the accompanying drawings illustrating preferred embodiments thereof and in which:—

Figure 1 is a view in cross-section. Fig. 2 is an elevation partly in section. Fig. 3 is a fragmentary view in elevation. Fig. 4 is a fragmentary plan view. Figs. 5, 6, 7 and 8 are similar views illustrating a conduit provided with a modified form of pipe support. Figs. 9, 10, 11 and 12 are similar views illustrating a further modification. Fig. 13 illustrates a modified form of joint.

Referring to Figs. 1 and 2, reference character 2 indicates the trench in which the conduit is laid. In this is placed a layer of broken stone, 4, which serves as a foundation for the conduit and affords suitable drainage about the same. In constructing my improved conduit the layer of broken stone is graded in the trench and one or more strips of heavy waterproof paper, 6, is laid upon the stone. A continuous trough-shaped bottom section is then constructed of cement or concrete, the bottom being furnished by the heavy paper, 6, which prevents the concrete entering the broken stone, 4, and the sides by the usual wooden molds which are afterward removed. During the construction of this portion of the conduit boards are placed at intervals transversely thereof with their ends and corners sunk into the concrete, and these boards form transverse and vertical grooves, 9, as shown in Figs. 3 and 4, in the bottom and walls of the bottom portion which are adapted subsequently to receive the pipe supports, 10.

As shown herein the pipe supports comprise flat plates recessed suitably to receive the piping in their upper edges and being beveled to allow for a free expansion of the pipes due to changing temperature. The manner of inserting and holding the pipe supporting devices above described constitutes an important feature of the present invention presenting numerous and obvious advantages. For example, suitable plates or bars may be cast at any foundry in the neighborhood of the conduit at a relatively low cost and thus the expense of transportation, as well as the cost of a more complicated pipe supporting device, may be saved. Further, it will be seen that the vertical grooves or slots in the sides of the conduit positively prevent displacement of the pipe supporting devices so that the pipes may be moved freely upon them without disturbing them while being gotten into position.

After having placed the pipe supporting plates, 10, in position the piping may be installed. By way of illustration I have shown a supply pipe, 12, and a return pipe, 14, extending side by side, but it will be clear that the shape of the conduit and the pipe supporting plates may be modified to take a number of pipes to suit the requirements of the work.

The conduit may be completed by forming a sectional covering therefor. In the preferred embodiment herein shown this cover is formed of sections of inverted channel pipe, 16, which is obtainable as a commercial article. The sections are placed with their edges resting upon the upper edges of the trough-shaped portion, 8. The joint between the channel piping and the bottom section is made with cement or other plastic material, 18, and the joints between the adjacent sections of the channel pipe may be made in the same way. Preferably the cement, 18, forming the longitudinal joints is formed with an outwardly sloping surface to direct surface water outwardly.

As each section of the channel piping, 16, is put in place the conduit may be filled with any desired heat insulating material, 20. In this connection it should be noted that, by making the bottom portion of the conduit of more or less flattened form, the quantity of heat insulating material required may be reduced, in some cases, by as much as 30% over the quantity required to fill a cylindrical conduit. This feature is of great importance from the standpoint of economy, since the expense of heat insulating material is considerable and the resulting saving an appreciable item.

While I have described the upper portion of the conduit as formed of channel pipes, it will be apparent that this may be constructed of sectional concrete arches if preferred.

In Figs. 5 to 8 is illustrated a conduit modified, in some respects, from that above described. In this modification a longitudinal ledge or shoulder, 22, is formed at each edge of the trough-shaped portion, 8, said shoulders being spaced from the outer sides of the covering channel pipes, 16, and forming therewith a recess to receive the cement or grouting, 28, forming the longitudinal joints. In this modification I have shown a different type of pipe support from that above described. This pipe support comprises a base-plate, 30, having flanges, 32, at its sides and a roller, 34, upon which the piping is carried. Oppositely disposed projections, 36, serve to prevent lateral displacement of the piping. In constructing the bottom portion of the conduit, flattened recesses, 38, are formed at suitable intervals for the reception of the base plates, 32.

While, in many cases, the conduit above described will be found sufficiently non-impervious to water for all practical purposes, it is within the scope of my invention to make additional provision for waterproofing should this be required. A conduit having such provision is illustrated in Figs. 9 to 12. In this modification the lower portion is constructed in two parts or sections 40 and 42 one within the other. Of these the outer part, 40, is first constructed in any preferred manner and is provided with a thick coating of tar paper and hot pitch, or other waterproof material, 44 on its inner surface. The inner part 42 is then constructed within the waterproof coating and in this part are formed recesses, 46, for pipe supports, 48. Preferably the edges of the tarred paper, 44, are left projecting above the surface of the bottom portion of the conduit and serve as a dam to retain the hot pitch used in making the longitudinal joints of the conduit. The upper portion of the conduit is formed of sectional channel pipe, 50, as in the modification hereinbefore described.

In Figs. 9 and 10 I have illustrated an arrangement which may be conveniently adopted in case it is desired to conduct seven pipes through the conduit. To this end a preferred supporting device may comprise a plate, 52, bent to form a bridge portion arranged to carry the pipe, 53, on intermediate rollers, 54, and having two side portions on which the pipes 55 are carried in a similar manner. Straps, 56, carrying the brackets, 57, may be attached to the pipe 53 at suitable intervals and pipes, 58, may be suspended from said brackets by any suitable hangers. Still another pair of pipes, 59, may be supported upon the brackets 57. The whole conduit may be filled with heat insulating material, 62.

The longitudinal edges of the channel pipe, used in constructing the covering portion of the conduit, are usually somewhat rough and ragged and in order to make a tight joint between such sections and the portion, 42, I have found it advantageous to form the longitudinal joint as indicated in Fig. 13. In this form of joint a shoulder, 61 is formed on the inner side of the part, 42, and this coöperates with the projecting edge of the waterproof paper, 44, to form a channel which is filled with pitch in which the ragged edges of the pipe sections may be set.

It will be noted that each of the parts 40 and 42 of the modification, illustrated in Figs. 9 and 10, is formed separately and comprises an integral trough-shaped portion. The term "integral bottom portion" as used hereinafter in the claims should, therefore, be construed to cover the portion, 42, or the portion, 40, but not both.

Having thus described my invention, I desire to secure it by Letters Patent of the United States and claim:—

1. A conduit for piping and the like, comprising a trough-shaped concrete bottom portion, a second similarly shaped portion within the first, an intermediate layer of waterproof material, the edges of which project above the edges of the inner of said portions, a curved cover portion resting on the inner portion, and waterproof filling between said cover portion and the projecting edge of the intermediate layer.

2. A conduit for piping and the like, comprising a trough-shaped bottom portion, a similarly shaped portion of concrete within the first, a cover portion resting on the inner of said portions, sheet material projecting upwardly adjacent to the outer surface of the inner portion and forming a channel with the outer surface of the cover portion, and waterproof filling in said channel.

3. A conduit for a line of piping, comprising a lower concave portion and an upper convex cover portion, said lower portion having an outer and an inner section with a layer of waterproof material between them and also a longitudinal projection extending along the outer upper edges of the inner section, the lower edges of the convex cover portion resting on the edges of the inner section within said projections, and waterproof material filling the space between the outer face of the cover portion and said longitudinal projections.

4. A conduit for piping and the like, comprising a trough-shaped portion having a longitudinal rib on one edge and a projecting flange of sheet material on the other, a cover portion of sectional channel pipe, the edges of which rest between the rib and the flange, and waterproof material retained by said rib and flange.

5. A conduit for protecting and insulating a line of piping comprising a flattened concave bottom portion, a layer of waterproof material co-extensive therewith, a series of recesses formed in the inner walls of the concave portion adjacent to the bottom thereof, means set in said recesses for supporting a line of piping above the bottom thereof, a convex closing portion formed of interlocking sections of channel pipe, and heat insulating material adjacent to the walls of the conduit.

6. That improvement in the art of constructing conduits which consists in laying a course of broken stone, placing waterproof paper thereon, forming a trough-shaped concrete bottom portion above said paper forming a second trough-shaped portion within the first, and finally forming a covering portion thereon of sectional channel pipe.

7. That improvement in the art of constructing conduits which consists in laying a course of broken stone, placing sheets of paper thereon, forming a trough-shaped concrete bottom portion above said paper, coating the inner surfaces thereof with water proof material, forming a second concrete portion within said first-mentioned portion and finally forming a covering portion thereon of sectional channel pipe.

8. That improvement in the art of constructing conduits which consists in laying a course of broken stone, forming a trough-shaped bottom portion of monolithic concrete thereon, coating the inner surface of said portion with waterproof material which projects above the edge thereof, forming a second concrete portion within the first, placing sections of channel pipe with their edges on the inner portion, and filling the space between the channel pipe and the projecting waterproof material with plastic material.

9. An underground conduit for steam piping and the like, comprising an integral concrete bottom portion having a continuous channel extending therein with upwardly extending side walls having substantially horizontal top surfaces, transversely extending members for supporting a line of piping above the bottom of the channel, a rounded cover portion comprising interlocking sections of channel-pipe disposed with their edges resting on the top surfaces of the side walls adjacent to the inner edges thereof, a longitudinal retaining shoulder at the top surfaces of each side wall extending parallel to the outer surface of the channel pipe sections and spaced therefrom, and grouting filling the recesses on either side of the channel pipe sections and coöperating with said sections to form a longitudinal joint.

10. A conduit for piping and the like, comprising a trough-shaped bottom portion, a similarly shaped portion of concrete within the first, a curved sectional cover portion resting with its edges on the inner of said bottom portions, waterproof material between the two bottom portions, there being a longitudinal channel extending along outside both edges of the cover portion, and waterproof filling in said channel.

In testimony whereof I affix my signature in presence of two witnesses.

PERCY N. KENWAY.

Witnesses:
JAMES O. WRIGHT,
H. W. KENWAY.